United States Patent
Matsuda et al.

(10) Patent No.: US 9,284,436 B2
(45) Date of Patent: Mar. 15, 2016

(54) MATERIAL FOR MOLDING, SHAPED PRODUCT THEREFROM, AND METHOD FOR MANUFACTURING SHAPED PRODUCT

(71) Applicant: Teijin Limited, Osaka-shi, Osaka (JP)

(72) Inventors: Takeshi Matsuda, Matsuyama (JP); Hodaka Yokomizo, Matsuyama (JP); Ikko Furukawa, Matsuyama (JP)

(73) Assignee: Teijin Limited, Osaka-shi, Osaka (JP)

( * ) Notice: Subject to any disclaimer, the term of this patent is extended or adjusted under 35 U.S.C. 154(b) by 0 days.

(21) Appl. No.: 14/412,726

(22) PCT Filed: Jul. 1, 2013

(86) PCT No.: PCT/JP2013/068041
§ 371 (c)(1),
(2) Date: Jan. 5, 2015

(87) PCT Pub. No.: WO2014/007213
PCT Pub. Date: Jan. 9, 2014

(65) Prior Publication Data
US 2015/0191583 A1    Jul. 9, 2015

(30) Foreign Application Priority Data

Jul. 5, 2012   (JP) ................................ 2012-151469

(51) Int. Cl.
| | |
|---|---|
| C08K 7/06 | (2006.01) |
| B29C 70/06 | (2006.01) |
| C08K 9/04 | (2006.01) |
| C08L 77/02 | (2006.01) |
| C08L 77/06 | (2006.01) |
| C08J 3/20 | (2006.01) |
| C08J 5/10 | (2006.01) |
| C08K 5/105 | (2006.01) |
| C08K 5/101 | (2006.01) |
| B29K 77/00 | (2006.01) |
| B29K 307/04 | (2006.01) |
| C08K 5/134 | (2006.01) |

(52) U.S. Cl.
CPC . *C08K 7/06* (2013.01); *B29C 70/06* (2013.01); *C08J 3/201* (2013.01); *C08J 5/10* (2013.01); *C08K 5/105* (2013.01); *C08K 9/04* (2013.01); *C08L 77/02* (2013.01); *C08L 77/06* (2013.01); *B29K 2077/00* (2013.01); *B29K 2307/04* (2013.01); *C08J 2377/06* (2013.01); *C08K 5/101* (2013.01); *C08K 5/1345* (2013.01); *Y10T 428/2918* (2015.01); *Y10T 428/2982* (2015.01)

(58) Field of Classification Search
CPC ............ C08J 5/042; C08K 7/06; C08K 5/101
See application file for complete search history.

(56) References Cited

U.S. PATENT DOCUMENTS

| | | | |
|---|---|---|---|
| 5,686,181 | A | 11/1997 | Takano et al. |
| 5,789,529 | A | 8/1998 | Matsumura et al. |
| 2011/0201731 | A1 | 8/2011 | Korzhenko et al. |
| 2012/0028047 | A1* | 2/2012 | Imai ......................... C08J 5/04 428/403 |

FOREIGN PATENT DOCUMENTS

| | | |
|---|---|---|
| EP | 0102158 A2 | 3/1984 |
| EP | 0102159 A2 | 3/1984 |
| JP | H01-271439 A | 10/1989 |
| JP | H03-121146 A | 5/1991 |
| JP | H03-158211 A | 7/1991 |
| JP | H03-181528 A | 8/1991 |
| JP | H05-112657 A | 5/1993 |
| JP | H06-166961 A | 6/1994 |
| JP | H07-11131 A | 1/1995 |
| JP | H08-337716 A | 12/1996 |
| JP | 2003-253113 A | 9/2003 |
| JP | 2008-246782 A | 10/2008 |

OTHER PUBLICATIONS

Oct. 3, 2014—(JP) International Preliminary Report on Patentability—App PCT/JP2013/068041—Eng Tran.
Sep. 24, 2013—International Search Report and Written Opinion—Intl App PCT/JP2013/068041.
Oct. 16, 2015—(EP) Supplementary Search Report—App 13813023.
Nov. 16, 2015—(EP) Examination Report—App 13813023.2.

* cited by examiner

*Primary Examiner* — Michael Pepitone
(74) *Attorney, Agent, or Firm* — Banner & Witcoff, Ltd.

(57) ABSTRACT

There is a material for molding including carbon fiber bundles to be easily impregnated, including carbon fibers and at least one impregnation aid in an amount of 3 to 15 parts by mass based on 100 parts by mass of the carbon fibers and satisfying a specific requirement, wherein 50 to 2,000 parts by mass of a thermoplastic polyamide is adhered to the carbon fiber bundles to be easily impregnated.

10 Claims, No Drawings

MATERIAL FOR MOLDING, SHAPED PRODUCT THEREFROM, AND METHOD FOR MANUFACTURING SHAPED PRODUCT

CROSS REFERENCE TO RELATED APPLICATIONS

This is a U.S. National Phase Application under 35 U.S.C. §371 of International Application No. PCT/JP2013/068041, filed Jul. 1, 2013, and published Under PCT Article 21(2), which claims priority to Japanese Application No. 2012-151469, filed Jul. 5, 2012, the entire contents of each of which are incorporated herein by reference.

TECHNICAL FIELD

The present invention relates to a material for molding in which a thermoplastic polyamide is adhered to carbon fiber bundles to be easily impregnated, a shaped product excellent in mechanical properties, which is obtained from the material for molding, and a method for manufacturing the shaped product.

BACKGROUND

A known technique for obtaining a resin material which has high strength and in which a brittle fracture tends to be suppressed is to reinforce a resin with carbon fibers to obtain a composite material. In particular, a composite material obtained by reinforcing a thermoplastic resin as a matrix resin with carbon fibers (the composite material are also called a carbon-fiber-reinforced thermoplastic resin, and are hereinafter often abbreviated to CFRTP) is excellent in terms of processability and suitability for recyclability and are expected to be utilized in various fields.

As a method for manufacturing a composite material including carbon fibers and a thermoplastic resin, a method in which carbon fiber bundles are impregnated with a molten-state thermoplastic resin having a relatively high viscosity to obtain a composite material. In this manufacturing method, it is necessary that an impregnation treatment for carbon fiber bundles with a thermoplastic resin is conducted for a long term at an excessively high pressure under a condition where a melt viscosity of the thermoplastic resin is lowered by elevating an ambient temperature, in order to avoid a trouble that strength of a molded article is reduced due to insufficient impregnation. In such an impregnation treatment for a long term at a high pressure, there has been a problem, for example, that manufacturing cost is increased.

As techniques for facilitating the impregnation of a thermoplastic resin into carbon fiber bundles, a method in which carbon fibers are intertwined with thermoplastic resin fibers to prepare fiber bundles, and heat and pressure are applied thereto to melt the thermoplastic resin so as to facilitate impregnation (patent document 1), a method in which carbon fiber bundles are impregnated with a molten resin having a low molecular weight and then impregnated with a thermoplastic resin having a high molecular weight (patent document 2), and a method in which carbon fibers are opened in a bath of a molten resin and are impregnated therewith (patent document 3), and the like, are disclosed. Furthermore, patent document 4 describes a method for facilitating impregnation of a thermoplastic resin into carbon fibers themselves, the method for adjusting a sizing agent of the carbon fibers to be a sizing agent having good wettability with the resin.

As described above, in the conventional production methods, it has been necessary to conduct an independent impregnation step under special conditions therein in order to sufficiently impregnate reinforcing fiber bundles with a thermoplastic resin. Because of this, the conventional methods are still unable to provide CFRTP products (shaped products) with excellent properties and appearance at such a low manufacturing cost that these products are increasingly usable in various applications, and do not sufficiently meet expectations of each field for CFRTP. Particularly, for CFRTP in which a thermoplastic polyamide (hereinafter sometimes abbreviated as PA) is used as the thermoplastic resin, it is expected to be applicable to various functional parts such as automobile parts and prompt solution of the above problem has been desired.

CITATION LIST

Patent Documents

Patent Document 1: JP-A-3-121146
Patent Document 2: JP-A-3-181528
Patent Document 3: JP-A-5-112657
Patent Document 4: JP-A-6-166961

SUMMARY OF THE INVENTION

Problems that the Invention is to Solve

An object of the invention is to provide a carbon-fiber-reinforced shaped product of a thermoplastic polyamide, the shaped product having excellent properties and an excellent appearance, a method for manufacturing the shaped product by a simple process without incurring an increase in manufacturing cost, and a material for molding to enable the manufacturing method.

Means for Solving the Problems

The present inventors, during investigations for solving the conventional problems described above, have found that carbon fiber bundles including a specific compound (hereinafter, the bundles are referred to as carbon fiber bundles to be easily impregnated) are exceedingly easily impregnated with plasticized thermoplastic polyamide. Furthermore, the inventors have discovered a surprising phenomenon in which when the thermoplastic polyamide is adhered to the carbon fiber bundles to be easily impregnated to obtain a material for molding and this material for molding is made to be present in a molding die under a condition at the plasticizing temperature of the thermoplastic polyamide, then the thermoplastic polyamide is impregnated into the carbon fiber bundles to be easily impregnated and spreads in the die while dispersing the carbon fiber bundles. The inventors thus have found that a shaped product of a composite material having excellent properties and an excellent appearance can be produced without conducting any treatment for impregnating reinforcing fibers with a thermoplastic resin in an independent step, as in conventional techniques, and have completed the invention. Essential points of the invention are shown below.

[1] A material for molding including:
carbon fiber bundles to be easily impregnated, including carbon fibers and at least one impregnation aid in an amount of 3 to 15 parts by mass based on 100 parts by mass of the carbon fibers, the at least one impregnation aid satisfying the following requirements 1 to 3; and
a thermoplastic polyamide in an amount of 50 to 2000 parts by mass based on 100 parts by mass of the carbon fibers, the thermoplastic polyamide adhered to the carbon fiber bundles to be easily impregnated:

Requirement 1: liquid at 280° C. has a viscosity of 10 Pa·s or less;

Requirement 2: a reduction ratio in a glass transition temperature (ΔTg) of larger than 0.2 (° C./%), the reduction ratio in glass transition temperature (ΔTg) being defined by the following expression (A) including a glass transition temperature $Tg_1$ (° C.) of a resin composition obtained by incorporating the impregnation aid in an amount of 1 part by mass to 100 parts by mass based on 100 parts by mass of the thermoplastic polyamide, the glass transition temperature $Tg_0$ (° C.) of the thermoplastic polyamide, and a content (%) of the impregnation aid:

Reduction ratio in glass transition temperature (ΔTg) (° C./%)=(($Tg_0$ (° C.))−($Tg_1$ (° C.))/(content of impregnation aid (%)))  (A)

wherein the content of impregnation aid (%) is defined by the following expression (B):

Content of impregnation aid (%)=100×(amount of impregnation aid (parts by mass))/(amount of the thermoplastic polyamide (parts by mass))  (B); and Requirement 3: a boiling point under normal pressure is 340° C. or more and a heating loss at 300° C. under a nitrogen atmosphere is 2%/minute or less.

[2] The material for molding according to [1], wherein the impregnation aid is a p-hydroxybenzoic acid alkyl ester, and an alkyl group in the alkyl ester has 14 or more carbon atoms.

[3] The material for molding according to [2], wherein the p-hydroxybenzoic acid alkyl ester is represented by formula (1):

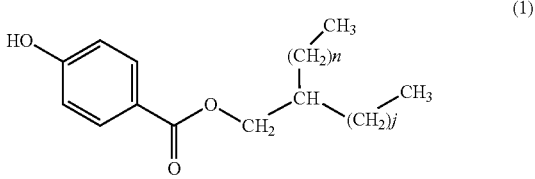

wherein, in formula (1), n is an integer of 4 to 7, and j is an integer of 6 to 9.

[4] The material for molding according to [1] wherein the thermoplastic polyamide has a melting point of 250 to 300° C.

[5] The material for molding according to [1] to [4], wherein the material for molding has a core-sheath structure in which the carbon fiber bundles to be easily impregnated is a core component and the thermoplastic polyamide is a sheath component.

[6] The material for molding according to any one of [1] to [5], wherein a form of the material for molding is a pellet.

[7] A shaped product obtained from the material for molding according to any one of [1] to [6].

[8] The shaped product according to [7], wherein carbon fibers derived from the carbon fiber bundles to be easily impregnated are dispersed in a state of having an average fiber length of 0.3 mm or more.

[9] The shaped product according to [7] or [8], wherein a content ratio of carbon fibers (% by mass) and a tensile strength of the material for molding determined by examination of a 4 mm dumbbell according to ISO 527 standard have a relationship satisfying the following expression (C):

Content ratio of carbon fibers (% by mass)×4+ 100<Tensile strength (MPa)  (C).

[10] A method for manufacturing the shaped product according to any one of [7] to [9], the method including: placing the material for molding in a mold under a condition of a plasticizing temperature or more of the thermoplastic polyamide to impregnate the thermoplastic polyamide into the carbon fiber bundles to be easily impregnated in the material for molding; molding the material for molding while separating and dispersing the carbon fiber bundles in the carbon fiber bundles to be easily impregnated; and then cooling a molded material.

Advantageous Effects of Invention

According to the invention, it is possible to provide a carbon-fiber-reinforced shaped product of a thermoplastic polyamide having excellent properties and an excellent appearance, a simple method for manufacturing the shaped product without incurring an increase in production cost, and a material for molding to enable the manufacturing method.

DESCRIPTION OF EMBODIMENTS

The present invention relates to: a material for molding characterized by including carbon fiber bundles to be easily impregnated including carbon fibers, at least one impregnation aid in an amount of 3 to 15 parts by mass based on 100 parts by mass of the carbon fibers, the at least one impregnation aid satisfying the following requirements 1 to 3, and a thermoplastic polyamide in amount of 50 to 2,000 parts by mass based on 100 parts by mass of the carbon fibers, the thermoplastic polyamide adhered to the carbon fiber bundles to be easily impregnated; a shaped product obtained from the material for molding; and a method for manufacturing the shaped product:

Requirement 1: the liquid at 280° C. has a viscosity of 10 Pa·s or less;

Requirement 2: a reduction ratio in glass transition temperature (ΔTg) of larger than 0.2 [° C./%], the reduction ratio in glass transition temperature (ΔTg) being defined by the following expression (A) including the glass transition temperature $Tg_1$ [° C.] of a resin composition obtained by incorporating the impregnation aid in an amount of 1 part by mass to 100 parts by mass based on 100 parts by mass of the thermoplastic polyamide the glass transition temperature $Tg_0$ [° C.] of the thermoplastic polyamide, and the content (%) of the impregnation aid:

Reduction ratio in glass transition temperature (ΔTg) [° C./%]=[($Tg_0$ [° C.])−($Tg_1$ [° C.])]/(content of impregnation aid [%])  (A)

wherein the content of impregnation aid [%] is defined by the following expression (B):

Content of impregnation aid [%]=100×(amount of impregnation aid [parts by mass])/(amount of the thermoplastic polyamide [parts by mass])  (B); and Requirement 3: boiling point under normal pressure is 340° C. or more and heating loss at 300° C. under a nitrogen atmosphere is 2%/minute or less.

Embodiments of the invention are explained below in detail. It is a matter of course that other embodiments can be within the scope of the invention so long as the embodiments do not depart from the spirit of the invention.

[Carbon Fiber Bundles to be Easily Impregnated]

The carbon fiber bundles to be easily impregnated in the invention are carbon fiber bundles characterized by including carbon fibers and at least one impregnation aid in an amount of 3 to 15 parts by mass based on 100 parts by mass of the carbon fibers, the at least one impregnation aid satisfying the following requirements 1 to 3 and by being thereby easily impregnated with a thermoplastic polyamide (preferably, a plasticized thermoplastic polyamide):

Requirement 1: the liquid at 280° C. has a viscosity of 10 Pa·s or less;

Requirement 2: a reduction ratio in glass transition temperature ($\Delta Tg$) of larger than 0.2 [° C./%], the reduction ratio in glass transition temperature ($\Delta Tg$) being defined by the following expression (A) including the glass transition temperature $Tg_1$ [° C.] of a resin composition obtained by incorporating the impregnation aid in an amount of 1 part by mass to 100 parts by mass based on 100 parts by mass of the thermoplastic polyamide, the glass transition temperature $Tg_0$ [° C.] of the thermoplastic polyamide, and the content (%) of the impregnation aid:

Reduction ratio in glass transition temperature ($\Delta Tg$) [° C./%]=[($Tg_0$ [° C.])−($Tg_1$ [° C.])]/(content of impregnation aid [%])  (A)

wherein the content of impregnation aid [%] is defined by the following expression (B):

Content of impregnation aid [%]=100×(amount of impregnation aid [parts by mass])/(amount of the thermoplastic polyamide [parts by mass])  (B); and Requirement 3: boiling point under normal pressure is 340° C. or more and heating loss at 300° C. under a nitrogen atmosphere is 2%/minute or less.

The carbon fiber bundles to be easily impregnated may be any carbon fiber bundles including the impregnation aid in a specific amount relative to the carbon fibers, and there are no limitations on a production method of the carbon fiber bundles to be easily impregnated and on the state in which the carbon fibers and the impregnation aid are included. The impregnation aid used in the invention should satisfy requirement 1, and this means that the impregnation aid is in a low viscosity state at 280° C., which is a representative processing temperature for general purpose thermoplastic polyamides, and is capable of viscosity measurement at 280° C. The viscosity of the liquid of the impregnation aid at 280° C. is preferably 8 Pa·s or less, more preferably 6 Pa·s or less.

With respect to requirement 1, as a method for measuring the viscosity of the impregnation aid as a liquid, use of a rotational viscometer is suitable. Specific examples thereof include a measurement method by using a parallel-plate viscometer equipped with a high-temperature chamber.

Furthermore, the impregnation aid used in the invention should satisfy requirement 2. With respect to requirement 2, the impregnation aid needs not satisfy [reduction ratio in glass transition temperature ($\Delta Tg$)]>0.2 [° C./%] throughout the whole content range of 1 to 100 parts by mass based on 100 parts by mass of the thermoplastic polyamide, and a part of the content range shows a reduction ratio in glass transition temperature ($\Delta Tg$) of larger than 0.2° C./%.

By a reduction ratio in glass transition temperature ($\Delta Tg$) of larger than 0.2° C./%, an effect of facilitating impregnation is developed, and a $\Delta Tg$ larger than 0.3° C./% is more preferable. The fact that $\Delta Tg$ is 0.2° C./% or less means that the impregnation aid shows an insufficient effect for lowering Tg of the thermoplastic polyamide. Therefore it is presumed that a measured value of Tg is substantially the same as the Tg of the thermoplastic polyamide.

Even when an impregnation aid having a $\Delta Tg$ of 0.2° C./% or less is added to carbon fiber bundles, and a resultant in which the thermoplastic polyamide is adhered thereto is molded, this impregnation aid shows a considerably low impregnation facilitating effect, resulting in an obtained shaped product has dispersion failures of the carbon fibers.

With respect to requirement 2, examples of methods for measuring the glass transition temperature of the thermoplastic polyamide or of a resin composition including the thermoplastic polyamide and the impregnation aid include a method in which a differential scanning calorimeter (DSC) is used.

With regard to the above Requirement 3, the phrase "boiling point under normal pressure is 340° C. or more" is understood that the case where boiling point of a certain impregnation aid under normal pressure is not clearly measured but boiling clearly does not occur at 340° C. and the aid still remains as liquid satisfies the requirement. Moreover, with regard to the phrase "heating loss at 300° C. under a nitrogen atmosphere is 2%/minute or less", the case where a certain impregnation aid vigorously decomposes at 300° C. under a nitrogen atmosphere and the heating loss cannot be correctly measured is understood not to satisfy the requirement.

Meanwhile, the above heating loss is preferably calculated based on the following formula (i), by using mass change measured with a differential thermal balance from an initial mass $W_{pre}$ (g) of a specimen of the impregnation aid to the mass $W_{post}$ (g) of the specimen after being heated from room temperature (5 to 35° C.) to 300° C. at 10° C./minute and subsequently further kept at 300° C. for 15 minutes. More preferred is an average value obtained by the measurement and calculation using three or more specimens.

Heating loss (%/minute)=100×{$W_{pre}$ (g)−$W_{post}$ (g)}/$W_{pre}$ (g)/15 (minute)  (i)

In the invention, the amount of the impregnation aid contained in the carbon fiber bundles to be easily impregnated is from 3 to 15 parts by mass, preferably from 5 to 12 parts by mass based on 100 parts by mass of the carbon fiber. When the amount is less than 3 parts by mass, the impregnation property of the thermoplastic polyamide into the carbon fibers becomes insufficient. While when the amount is more than 15 parts by mass, the impregnation property of the thermoplastic polyamide into the carbon fibers is superior, heat resistance of the shaped product decreases due to a decrease in the glass transition temperature of the thermoplastic polyamide as a matrix resin, so that the case is not preferred. The amount of the impregnation aid contained in the carbon fiber bundles to be easily impregnated can be controlled by sizing conditions (e.g., line velocity, concentration of the impregnation aid in an emulsion, or the like).

The carbon fiber bundles to be easily impregnated for use in the invention may contain a plurality of impregnation aids, and the impregnation aid for use in the invention is preferably a specific p-hydroxybenzoic acid alkyl ester as mentioned later.

Representative methods for producing the carbon fiber bundles to be easily impregnated include a method in which an impregnation aid is incorporated into general-purpose carbon fiber bundles by at least one method selected from the group consisting of a dipping method, a spraying method, a roller transfer method, a slit coater method, and the like. In the case where an impregnation aid is incorporated into carbon fiber bundles by any of these methods, it is thought that the impregnation aid is mainly adhered to the surface of the carbon fiber bundles, and some parts of the impregnation aid are incorporated into inner parts of the carbon fiber bundles.

With respect to the form of the impregnation aid in the production of the carbon fiber bundles to be easily impregnated, the impregnation aid can be handled as an aqueous emulsion, a solution obtained by dilution with an organic solvent, or a heated liquid in a viscous or molten state. A preferred combination of a production method and a form of an impregnation aid includes a dipping or a roller transfer method in the case of an aqueous emulsion. This combination necessitates a drying step in which the carbon fiber bundles are dried in an atmosphere of 100° C. or more in order to sufficiently remove the water. In the case of a heated viscous liquid, a general coating technique such as a slit coater method is usable, and it is possible to adhere the heated viscous liquid in a suitable amount to the carbon fiber bundles and then to perform even adhesion with a smoothing roll or the like.

In order to obtain a shaped product in which the carbon fibers are evenly dispersed in the thermoplastic polyamide by molding the material for molding of the invention, it is preferred to adhere to the impregnation aid to the carbon fiber bundles as evenly as possible. Examples of methods for more evenly adhering an impregnation aid to carbon fiber bundles include a method in which the impregnation aid is adhered to the carbon fiber bundles by any of the methods shown above and the resultant is subjected to a re-heat treatment by heating to a temperature or more which the viscosity of the impregnation aid decreases sufficiently. For the heat treatment, a hot air, a hot plate, a roller, an infrared-ray heater, and the like, can be used. It is preferred to use rollers.

[Carbon Fiber]

The carbon fibers contained in the material for molding of the invention may be any carbon fibers, such as polyacrylonitrile (PAN)-based carbon fibers, petroleum/petroleum pitch-based carbon fibers, rayon-based carbon fibers, or lignin-based carbon fibers. In particular, PAN-based carbon fibers, which are produced from PAN as a starting material, are preferred because these carbon fibers are excellent in terms of factory-scale manufacturability and mechanical property.

The above carbon fiber preferably has an average diameter of 3 to 12 µm, and one having an average diameter of 5 to 10 µm can be more preferably used, one having an average diameter of 5 to 9 µm can be further preferably used, and one having an average diameter of 5 to 7 µm can be still more preferably used. Meanwhile, a common carbon fiber is a carbon fiber filament in which 1,000 to 50,000 single fibers are bundled. The carbon fiber bundle in the invention includes such common carbon fiber filaments and also includes those obtained by superposing and doubling the carbon fiber filaments, those obtained by twisting the doubled one into a twisted yarn, and the like.

As the carbon fiber to be contained in the material for molding of the invention, in order to enhance the adhesiveness between the carbon fibers and the thermoplastic polyamide, a carbon fiber having an oxygen-containing functional group introduced onto the surface of the carbon fiber by a surface treatment is also preferred.

Moreover, in the case where the carbon fiber bundles to be easily impregnated is formed by incorporating the impregnation aid into the carbon fiber bundle as mentioned above, in order to stabilize the step of homogeneously adhering the impregnation aid to the carbon fiber bundle, the carbon fiber bundle is preferably treated with a sizing agent for imparting a bundling property. As the sizing agent, those known for manufacturing carbon fiber filament can be used. Moreover, as the carbon fiber bundle, one in which oil used for enhancing a sliding ability at manufacturing remains can be used in the invention of the present application without any trouble. Meanwhile, there is a case where an expression of a surface treatment agent is used as a broader concept including the impregnation aid and the other treatment agents such as the above sizing agent.

[p-Hydroxybenzoic Acid Alkyl Ester]

The impregnation aid satisfying the above Requirements 1 to 3, which is used in the invention, is a p-hydroxybenzoic acid alkyl ester, and the number of carbon atoms in the alkyl group is preferably 14 or more, more preferably 14 or more and 30 or less, and still more preferably 14 or more and 20 or less.

Such a p-hydroxybenzoic acid alkyl ester in which the number of carbon atoms in the alkyl group is 14 or more is preferably p-hydroxybenzoic acid ester(s) of one or more kinds of aliphatic alcohols selected from the group consisting of linear aliphatic alcohols having 14 or more carbon atoms, aliphatic alcohols having a branched chain having 14 or more carbon atoms, aliphatic alcohols having 14 or more carbon atoms and containing one or more double bonds, and aliphatic alcohols having 14 or more carbon atoms and containing one or more aromatic rings. Meanwhile, the above p-hydroxybenzoic acid alkyl ester of the aliphatic alcohol is not limited to a compound obtained by direct esterification of the aliphatic alcohol with p-hydroxybenzoic acid, and the compound obtained from another derivative such as an alkyl halide as a raw material is also included as a matter of course.

Examples of the p-hydroxybenzoic acid ester of the linear aliphatic alcohol having 14 or more carbon atoms include p-hydroxybenzoic acid esters of one or more kinds of linear aliphatic alcohols selected from the group consisting of 1-tetradecanol, 1-hexadecanol, 1-octadecanol, 1-eicosanol, and 1-docosanol.

Examples of the p-hydroxybenzoic acid ester of the aliphatic alcohol having a branched chain having 14 or more carbon atoms include p-hydroxybenzoic acid esters of one or more kinds of aliphatic alcohols having a branched chain selected from the group consisting of hexyldecanol, isostearyl alcohol, octyldodecanol, and decyltetradecanol.

Examples of the p-hydroxybenzoic acid ester of the aliphatic alcohol having 14 or more carbon atoms and containing one or more double bonds include p-hydroxybenzoic acid ester of oleyl alcohol, and the like.

Examples of the p-hydroxybenzoic acid ester of the aliphatic alcohol having 14 or more carbon atoms and containing one or more aromatic rings include p-hydroxybenzoic acid ester of octylbenzyl alcohol, and the like.

The above p-hydroxybenzoic acid alkyl ester in which the number of carbon atoms of the alkyl group is 14 or more is more preferably the p-hydroxybenzoic acid ester of an aliphatic alcohol having a branched chain having 14 or more carbon atoms, which is a p-hydroxybenzoic acid alkyl ester of a primary alcohol that is branched at a carbon atom adjacent to the carbon atom to which the hydroxyl group is attached, i.e., at 2-position (β-position), represented by the following formula (1).

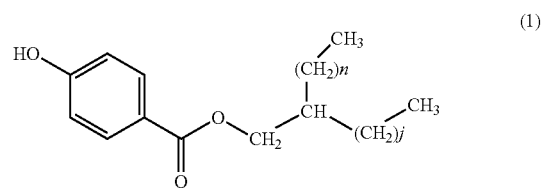

(1)

In the formula (1), n is an integer of 4 to 7, and j is an integer of 6 to 9.

The p-hydroxybenzoic acid alkyl ester in which the number of carbon atoms of the alkyl group is 14 or more, represented by the above formula (1) is particularly preferably one or more kinds thereof selected from the group consisting of p-hydroxybenzoic acid 2-hexydecyl ester, p-hydroxybenzoic acid 2-octyldodecyl ester, and p-hydroxybenzoic acid 2-decyltetradecyl ester, and is further preferably p-hydroxybenzoic acid 2-hexydecyl ester.

[Material for Molding]

The material for molding of the invention is constituted by the carbon fiber bundles to be easily impregnated described above and a thermoplastic polyamide which is adhered to the carbon fiber bundles to be easily impregnated in an amount of 50 to 2,000 parts by mass based on 100 parts by mass of the carbon fibers contained in the carbon fiber bundles to be easily impregnated. The amount of the adhered thermoplastic polyamide is more preferably 66 to 1,900 parts by mass. The amount of the adhered thermoplastic polyamide is further preferably 100 to 600 parts by mass. The shape of the material for molding of the invention is not particularly limited, and examples thereof include columnar, platy, granular, massive, fibrous (stringy), and net shapes. It is also possible to use a plurality of materials for molding having different shapes and to mold these materials.

Examples of a method for adhering the thermoplastic polyamide to the carbon fiber bundles to be easily impregnated to obtain the material for molding of the invention includes a method for covering the surface of the carbon fiber bundles to be easily impregnated with a molten-state thermoplastic polyamide, a method for casting a molten-state thermoplastic polyamide on the carbon fiber bundles to be easily impregnated, the carbon fiber bundles arranged in parallel, using a T-die or the like to superpose a layer of the thermoplastic polyamide, a method for layering a film-form thermoplastic polyamide resin on the carbon fiber bundles to be easily impregnated arranged in parallel, and a method for spraying a powdery thermoplastic polyamide on the carbon fiber bundles to be easily impregnated arranged in parallel. It is also possible to similarly use a lump of cut fiber bundles obtained by cutting the carbon fiber bundles to be easily impregnated into a specific length, in place of the continuous carbon fiber bundles to be easily impregnated, the continuous carbon fiber bundles arranged in parallel.

It is preferred that the material for molding of the invention has a core-sheath structure in which the carbon fiber bundle which is easily impregnated is a core component and the thermoplastic polyamide is a sheath component. In particular, in the case where the material for molding of the invention is used for injection molding, this material for molding is more preferably a pellet having a core-sheath structure in which the carbon fiber bundle which is easily impregnated is a core component and the thermoplastic polyamide is a sheath component, the core-sheath structure obtained by cutting, with a strand cutter, strands including the carbon fiber bundles to be easily impregnated and the thermoplastic polyamide that covers the periphery of the carbon fiber bundles to be easily impregnated. Even more preferably, this material for molding is a pellet having a longitudinal-direction length of about 3 to 10 mm (hereinafter often referred to as a core-sheath pellet). There are no particular limitations on the diameter of the core-sheath pellet. However, the diameter thereof is preferably from 1/10 to 2 times the length of the pellet, and is more preferably from 1/4 the length of the pellet to the same dimension as the length of the pellet.

[Thermoplastic Polyamide]

The thermoplastic polyamide resin for use in the invention is preferably, as a polyamide (hereinafter sometimes abbreviated as PA and also another name, i.e., Nylon may be used), at least one kind selected from the group consisting of PA6 (also called polycaproamide or polycaprolactam, more correctly poly-ε-caprolactam), PA26 (polyethylene adipamide), PA46 (polytetramethylene adipamide), PA66 (polyhexamethylene adipamide), PA69 (polyhexamethylene azepamide), PA610 (polyhexamethylene sebacamide), PA611 (polyhexamethylene undecamide), PA612 (polyhexamethylene dodecamide), PA11 (polyundecanamide), PA12 (polydodecanamide), PA1212 (polydodecamethylene dodecanamide), PA6T (polyhexamethylene terephthalamide), PA6I (polyhexamethylene isophthalamide), PA912 (polynonamethylene dodecanamide), PA1012 (polydecamethylene dodecanamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalamide), PA12T (polydodecamethylene terephthalamide), PA12I (polydodecamethylene isophthalamide), and polyamideMXD6 (polymetaxylylene adipamide).

Among the above thermoplastic polyamides, preferred include those obtained from aromatic dicarboxylic acids and aliphatic diamines or those obtained from aliphatic dicarboxylic acids and aromatic diamines, which are polyamides having a high melting point and are called aromatic polyamides, and polyamide 66 and polyamide 46 having a high melting point among the aliphatic polyamides. More specifically, the melting point of a thermoplastic polyamide homopolymer for use in the invention is preferably from 250 to 300° C., and the melting point of a thermoplastic polyamide copolymer is preferably from 260 to 290° C., and further preferably from 265 to 285° C.

In the thermoplastic polyamide copolymer, the acid component monomer having two or more functionalities to be copolymerized includes aliphatic or aromatic polybasic acids such as isophthalic acid, naphthalenedicarboxylic acid, adipic acid, sebacic acid, trimellitic acid, and succinic acid, or derivatives thereof capable of forming esters as components other than terephthalic acid or lower alcohol ester derivatives thereof, mentioned above; aromatic hydroxycarboxylic acids such as hydroxybenzoic acid and hydroxynaphthoic acid, or derivatives thereof capable of forming esters; and the like. The polyhydroxy component monomer having two or more functionalities to be polycondensed with the acid component monomer includes, as components other than 1,4-butanediol mentioned above, lower alkylene glycols such as ethylene glycol, diethylene glycol, propylene glycol, trimethylene glycol, hexamethylene glycol, neopentyl glycol, cyclohexanedimethanol, and 1,3-octanediol; aromatic polyhydroxy compounds such as 2,2-bis(4-hydroxyphenyl)propane (bisphenol A) and 4,4'-dihydroxybiphenyl; alkylene oxide adducts of aromatic polyhydroxy compounds such as ethylene oxide (2 mol) adduct of bisphenol A and propylene oxide (3 mol) adduct of bisphenol A; polyols such as glycerin and pentaerythritol; and the like.

In the invention, any of thermoplastic polyamides produced by polycondensing the acid component monomers and the polyhydroxy component monomers as mentioned above can be used. The above each component monomer can be used solely or as a mixture of two or more thereof but, from the standpoint of requiring physical properties original in the thermoplastic polyamide, the homopolymer of the thermoplastic polyamide is preferably used.

As manufacturing methods of the thermoplastic polyamide homopolymer or copolymer, polymerization may be conducted by (i) a method of directly polymerizing 1,4-butanediol, terephthalic acid, and, if necessary, comonomer component(s); (ii) a method of performing polymerization through ester exchange of these components; or the like, which are not special methods but are commonly known. Hereinafter, except for the case where discrimination is necessary, the thermoplastic polyamide homopolymer or copolymer is simply referred to as a thermoplastic polyamide resin.

Moreover, for the purpose of enhancing flowability, appearance glossiness, flame retardancy, thermal stability, weatherability, impact resistance, and the like, various polymers, fillers, stabilizers, pigments, and the like may be blended so long as the blending thereof does not impair mechanical strength.

[Shaped Product and Manufacturing Method Thereof]

As stated above, the material for molding of the invention is molded by an existing thermoplastic-resin molding method without subjecting the material for molding to a treatment for impregnating reinforcing fibers with a thermoplastic resin in an independent step as in conventional techniques. As a result, the thermoplastic polyamide is impregnated into the carbon fiber bundles to be easily impregnated in the material for molding, and the material for molding melts and flows, and spreads in the mold while spreading the carbon fiber bundles to obtain a shaped product having satisfactory properties.

Namely, this application further includes: an invention relating to a shaped product formed from the material for molding of the invention; and an invention relating to a method for manufacturing a shaped product characterized by making the material for molding be present in a mold under a condition of the plasticizing temperature or more of the thermoplastic polyamide, thereby impregnating the thermoplastic polyamide into the carbon fiber bundles to be easily impregnated in the material for molding, molding this material for molding while separating and dispersing the carbon fiber bundles of the carbon fiber bundles to be easily impregnated, and then cooling the molded material.

In the method of the invention for manufacturing a shaped product, the wording "separate and disperse the carbon fiber bundles of the carbon fiber bundles to be easily impregnated" means that the carbon fiber bundles are separated and dispersed to such a degree that the carbon fibers do not form a lump in the shaped product. Thus, a shaped product having excellent properties and an excellent appearance can be obtained even when carbon fiber bundles such as carbon fiber filaments are not completely separated into several thousands to tens of thousands of the constituent single carbon fibers.

When the shaped product of the invention is manufactured, the material for molding described above can be used in any of various forms suitable for the molding method employed.

For example, in the case of injection molding, the material for molding can be used in the form of a pellet (a core-sheath pellet) obtained by cutting strands constituted by the carbon fiber bundles to be easily impregnated and a thermoplastic polyamide that covers the periphery thereof, with a strand cutter into a length of about 3 to 10 mm.

In the case of obtaining a large plate shaped product, press molding is effective. In the case where press molding is conducted, a method in which a plate material for molding constituted by a layer of the carbon fiber bundles to be easily impregnated and the thermoplastic polyamide layered thereon is prepared and this material for molding is heated to the plasticizing temperature or more of the thermoplastic polyamide, put in a press mold, and then molded at a specific pressing pressure. Depending on shapes, or the like, a method in which a material for molding according to the invention is hot-pressed to obtain a preform beforehand and this preform is molded is also effective.

In the case where the shaped product is obtained by molding using the material for molding of the invention without adding another material for molding and/or an additive, as a matter of course, compositions of the material for molding and the shaped product, such as the carbon fiber contents (on the basis of mass) and the carbon fiber content ratios that represent ratios of the carbon fiber contents, are the same. Accordingly, the amounts of the carbon fiber and the thermoplastic polyamide contained in the shaped product of the invention and preferable ranges thereof are as mentioned above for the material for molding.

Meanwhile, in the case where the material for molding of the invention is used and molded without adding any other material for molding or any additive thereto, the content (ratio) of carbon fibers determined by examining either the material for molding or the shaped product obtained can be regarded as the content (ratio) of carbon fibers in the other. Even in the case where the material for molding of the invention is molded after another material for molding and additives, or the like, are added thereto, the content (ratio) of carbon fibers in either the material for molding of the invention or the shaped product can be determined from the content (ratio) of carbon fibers in the other through calculations from the amounts of those ingredients added.

Shaped products of conventional carbon-fiber-reinforced thermoplastic resins are obtained by molding a pellet or the like, as a material, the pellet obtained by melt-kneading a thermoplastic resin and carbon fibers with a twin-screw extruder or the like in order to evenly disperse the carbon fibers in the thermoplastic resin. In this method, however, the carbon fibers are broken in the extruder because of the kneading conducted under high shear, and the shaped product obtained has a carbon fiber length reduced to less than 0.3 mm, resulting in a decrease in the property-enhancing effect of the fibers. In contrast, the shaped product obtained from the material for molding of the invention is excellent in terms of the impregnation property of the thermoplastic polyamide into the carbon fiber bundles, and therefore the carbon fiber bundles need not be kneaded together with the molten resin under high shear. Because of this, the shaped product obtained contains the carbon fibers which remain long, and has excellent mechanical strength.

The shaped product of the invention is preferably a shaped product in which the carbon fibers resulting from separation of the carbon fiber bundles to be easily impregnated are dispersed so as to have an average fiber length of 0.3 mm or more, and more preferably is a shaped product in which the carbon fibers are dispersed so as to have an average fiber length of 0.4 mm or more. In the shaped product of the invention, there is no particular upper limit on the average fiber length of the carbon fibers remaining therein, and the average length thereof depends on applications and the molding method employed. For example, in the case of a shaped product obtained by injection molding in which a pellet obtained by cutting, with a strand cutter, strands constituted by the carbon fiber bundles to be easily impregnated and the thermoplastic polyamide that covers the periphery of the carbon fiber bundles to be easily impregnated are used as a material for molding, the average fiber length of the carbon fibers is generally about 10 mm or less. The higher the degree of impregnation of carbon fiber bundles with a thermoplastic resin is, the more the carbon fibers are apt to break during injection molding. Thus, there are often cases where injection-shaped products have an average fiber length of 2 mm or less.

Furthermore, it is preferable that the shaped product of the invention, when examined with respect to a tensile specimen having a thickness of 4 mm according to ISO standard 527, is satisfy a relationship represented by the following expression (C).

[Content ratio of carbon fibers (% by weight)]×4+
100<[tensile strength (MPa)]   (C)

The establishment of the expression (C) means that the tensile strength of the shaped product of a carbon fiber reinforced thermoplastic resin is exceedingly high for the content of carbon fibers and that this shaped product is highly preferred from the standpoints of cost and properties.

EXAMPLES

The invention will be explained below in detail by reference to Examples, but the invention should not be construed as being limited to the following Examples.

The impregnation aids used in the Examples and Comparative Examples are shown below. The viscosity of the liquid of each of the impregnation aids was measured with a parallel-plate viscometer using a viscoelastometer (RDA2) manufactured by Rheometric Inc. under the conditions of a strain rate of 1/s and 280° C. The glass transition temperatures of the thermoplastic polyamide and of the resin composition obtained by incorporating an impregnation aid into the thermoplastic polyamide were measured using thermal analyzer DSC-Q20, manufactured by TA Instruments Inc., under the conditions of a heating rate of 20° C./min.

The heating loss (%/minute) of the impregnation aid is an average value for 3 specimens, which was calculated according to the above formula (i), by using mass change measured with a differential thermal balance from an initial mass $W_{pre}$ (g) of each specimen of the impregnation aid to the mass $W_{post}$ (g) of the each specimen after being heated from room temperature to 300° C. at 10° C./minute and subsequently further kept at 300° C. for 15 minutes.

1) p-Hydroxybenzoic Acid Alkyl Ester having 14 or More Carbon Atoms

As a p-hydroxybenzoic acid alkyl ester having 14 or more carbon atoms, p-hydroxybenzoic acid 2-hexyldecyl ester (EXCEPARL HD-PB manufactured by KAO Corporation) was used.

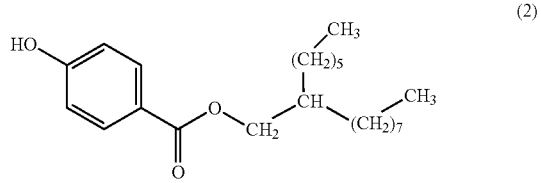
(2)

The liquid viscosity thereof at 280° C. is 5 Pa·s. The glass transition temperature $Tg_1$ shown by a resin composition obtained by blending 10 parts by mass of the p-hydroxybenzoic acid alkyl ester based on 100 parts by mass of polyamide 66 ($Tg_0$=50° C.) is 45° C., so that the reduction ratio in glass transition temperature (ΔTg) defined by the above expression (A) is 0.5° C./% that is larger than 0.2° C./%. The boiling point of the p-hydroxybenzoic acid alkyl ester under normal temperature is 472° C. and heating loss at 300° C. under a nitrogen atmosphere is 0.077 (%/minute).

2) p-Hydroxybenzoic Acid 2-Ethylhexyl Ester

The liquid viscosity of p-hydroxybenzoic acid 2-ethylhexyl ester at 280° C. is 2 mPa·s (2×10⁻³ Pa·s). The glass transition temperature $Tg_1$ shown by a resin composition obtained by blending 2 parts by mass of p-hydroxybenzoic acid 2-ethylhexyl ester based on 100 parts by mass of polyamide 66 ($Tg_0$=50° C.) is 49° C., so that the reduction ratio in glass transition temperature (ΔTg) defined by the above expression (A) is 0.5° C./% that is larger than 0.2° C./%. However, p-hydroxybenzoic acid 2-ethylhexyl ester vigorously decomposed at 300° C. under a nitrogen atmosphere and thus heating loss thereof was not able to measure correctly. Therefore, it was apparent that heating loss was not 2%/minute or less.

The measuring test methods and evaluation methods used in the Examples and Comparative Examples are as follows.
(Content and Content Ratio of Carbon Fiber in Material for Molding, Shaped Product, or the Like)

The content of carbon fibers was determined by putting the material for molding such as a pellet or a specimen cut out of the shaped product into a crucible, introducing the crucible into a muffle furnace in which the internal temperature was set at 600° C., thereby burning off the resin component, and calculating the content of carbon fibers from the mass of the residual carbon fibers. Meanwhile, the expression "content ratio of carbon fibers (% by mass)" used for a material for molding or shaped product means the ratio of the mass of the carbon fibers to the whole mass of not only the carbon fibers and the thermoplastic polyamide but also the impregnation aid, and the like.

(Content, Content Ratio of Surface Treatment Agent)

The amount of a surface-treating agent such as an impregnation aid, contained in carbon fiber bundles to be easily impregnated, carbon fiber filaments, or the like, was determined by putting a carbon fiber bundle cut out in a length of 1 m into a crucible, introducing the crucible into a muffle furnace in which the internal temperature was set at 550° C. for 15 minutes to burn off the surface-treating agent component, and calculating the content of the surface-treating agent from the mass of the residual carbon fibers.

(Measurement of Tensile Strength)

Dumbbell specimens were produced from a material for molding obtained, by means of an injection molding machine and subjected to a measurement of tensile strength in accordance with ISO 527 (JIS K 7161).

(Evaluation of Surface Appearance of Shaped Product)

The surface appearance of each of shaped products obtained was examined. The shaped products in which neither any fibrous lump with a diameter of 3 mm or larger, formed by insufficient impregnation of the thermoplastic polyamide into the carbon fiber bundles nor any bubble was observed in the surface thereof are indicated by ○ (good); the shaped products in which a bubble was observed although no such fibrous lump was observed are indicated by Δ (slightly poor); and the shaped products in which such fibrous lump was observed are indicated by × (poor).

(Evaluation of Carbon Fiber Length in Shaped product)

A specimen having a size of 20 mm×10 mm was cut out of each composite shaped product obtained and heated at 550° C. in an oxygen-containing atmosphere for 1.5 hours to burn off the resin component. The residual carbon fibers were added to water containing a surfactant, and this mixture was sufficiently stirred by ultrasonic vibration. The dispersion obtained through the stirring was randomly specimend with a measuring spoon to obtain a specimen for evaluation. This specimen was examined with image analyzer Luzex AP, manufactured by Nireco Corp., to measure the lengths of 3,000 fibers. An average of the lengths was calculated to determine the average fiber length of the carbon fibers contained in the shaped product. Details are shown below in Examples and Comparative Examples.

Example 1

As an impregnation aid, p-hydroxybenzoic acid 2-hexyldecyl ester (EXCEPARL HD-PB manufactured by KAO Corporation) was used. This impregnation aid was emulsified so as to result in a nonvolatile content of 12% by mass. PAN-based carbon fiber filaments (STS40, manufactured by Toho Tenax Co., Ltd.; corresponding to 24K; fiber diameter, 7.0 µm; number of filaments, 24,000; tensile strength, 4,000 MPa) as carbon fiber bundles were passed through the resultant solution. Thereafter, the carbon fiber filaments were passed between nip rolls to remove the excess adhered solution and then passed over 2 minutes through a hot-air drying oven heated at 180° C., thereby drying the carbon fiber filaments to obtain carbon fiber bundles to be easily impregnated. This carbon fiber bundles to be easily impregnated, obtained by the treatment, were passed along two metallic rolls having a diameter of 60 mm and heated at 200° C., thereby conducting a heat treatment again to obtain carbon fiber bundles to be easily impregnated, in which the impregnation aid was more evenly adhered to the carbon fiber bundles. The carbon fiber bundles to be easily impregnated had a content of the impregnation aid of 6% by mass (6.4 parts by mass based on 100 parts by mass of the carbon fibers).

Subsequently, the carbon fiber bundles to be easily impregnated obtained above were coated with polyamide 66 (manufactured by Ube Industries, Ltd.: UBE Nylon 66, melting point: 265° C.) using a crosshead die for electrical-wire coating having an orifice diameter of 3 mm and were then cut into a length of 6 mm, thereby obtaining a material for molding in the form of core-sheath pellets suitable for injection molding, the material for molding having a content ratio of carbon fibers of 20% by mass (the amount of the polyamide was 393.6 parts by mass based on 100 parts by mass of the carbon fibers), a diameter of 3.2 mm, and a length of 6 mm. Using a 110-ton electric injection molding machine (J110AD) manufactured by The Japan Steel Works, Ltd., the material for molding was injection-molded at cylinder temperatures of C1/C2/C3/C4/N=280° C./290° C./290° C./290° C./280° C. (C1 to C4 were cavity and N was nozzle) at a molding cycle time of 35 seconds to obtain a dumbbell for tensile test having a thickness of 4 mm. The shaped products obtained had a satisfactory appearance in which neither any fibrous lump due to dispersion failure nor a bubble was observed. The shaped products had a tensile strength of 252 MPa to show excellent mechanical properties. The fibers contained in the shaped products had an average length of 1.2 mm. The results obtained are shown in Table 1.

Example 2

The same procedure as in Example 1 was conducted, except that the concentration of the solution obtained by emulsifying p-hydroxybenzoic acid 2-hexyldecyl ester (EXCEPARL HD-PB manufactured by KAO Corporation) as an impregnation aid was adjusted to a nonvolatile content of 25% by weight to treat the carbon fiber filaments, and resulting in obtaining carbon fiber bundles to be easily impregnated, having a content of the impregnation aid of 11% by mass (12.3 parts by mass based on 100 parts by mass of the carbon fibers). The shaped products obtained showed a satisfactory appearance and mechanical properties. The results obtained are shown in Table 1.

Example 3

The same procedure as in Example 2 was conducted, except that the coating of the carbon fiber bundles to be easily impregnated with polyamide 66 using a crosshead die for electrical-wire coating having an orifice diameter of 3 mm was conducted so that the pellet-form material for molding obtained had a content ratio of carbon fibers of 30% by mass (the amount of the thermoplastic polyamide was 221 parts by mass based on 100 parts by mass of the carbon fibers). The shaped products obtained showed a satisfactory appearance and mechanical properties. The results obtained are shown in Table 1.

Example 4

As an impregnation aid, p-hydroxybenzoic acid 2-hexyldecyl ester (EXCEPARL HD-PB manufactured by KAO Corporation) was used. This impregnation aid was emulsified so as to result in a nonvolatile content of 12% by mass, and the carbon fiber filament was treated therewith to obtain carbon fiber bundles to be easily impregnated, having a content of the impregnation aid of 10.5% by mass (11.7 parts by mass based on 100 parts by mass of the carbon fiber).

Subsequently, the carbon fiber bundles to be easily impregnated obtained above were coated with polyamide 10T (manufactured by Daicel-Evonik, Ltd.: VESTAMID HT plus, melting point: 285° C.) using a crosshead die for electrical-wire coating having an orifice diameter of 3 mm and were then cut into a length of 6 mm, thereby obtaining a material for molding in the form of core-sheath pellets suitable for injection molding, the material for molding having a content ratio of carbon fibers of 20% by mass (the amount of the polyamide 10T was 388.3 parts by mass based on 100 parts by mass of the carbon fibers), a diameter of 3.2 mm, and a length of 6 mm. Using a 110-ton electric injection molding machine (J110AD) manufactured by The Japan Steel Works, Ltd., the material for molding was injection-molded at cylinder temperatures of C1/C2/C3/C4/N=320° C./330° C./330° C./330° C./320° C. (C1 to C4 were cavity and N was nozzle) at a molding cycle time of 35 seconds to obtain a dumbbell for tensile test having a thickness of 4 mm. The shaped products obtained had a satisfactory appearance in which neither any fibrous lump due to dispersion failure nor a bubble was observed. The results obtained are shown in Table 1.

Example 5

The same procedure as in Example 4 was conducted, except that the coating of the carbon fiber bundles to be easily impregnated with polyamide 10T using a crosshead die for electrical-wire coating having an orifice diameter of 3 mm was conducted so that the pellet-form material for molding obtained had a content ratio of carbon fibers of 30% by mass (the amount of the thermoplastic polyamide was 221.6 parts by mass based on 100 parts by mass of the carbon fibers). The shaped products obtained showed a satisfactory appearance and mechanical properties. The results obtained are shown in Table 1.

Example 6

The same procedure as in Example 1 was conducted, except that p-Hydroxybenzoic acid 2-hexyldecyl ester which had been heated to 120° C. and melted to form a liquid was added dropwise to the surface of the carbon fiber bundle instead of the emulsified solution of p-hydroxybenzoic acid 2-hexyldecyl ester as an impregnation aid, and the resultant was passed through a hot bar heated at 120° C. to impregnate the molten p-hydroxybenzoic acid 2-hexyldecyl ester into the carbon fiber bundle, resulting in obtaining carbon fiber bundles to be easily impregnated, having a content ratio of the p-Hydroxybenzoic acid 2-hexyldecyl ester, as an impregnation aid, of 6% by mass (6.4 parts by mass based on 100 parts by mass of the carbon fiber). The resulting shaped product showed good appearance and mechanical properties. Results are shown in Table 1.

Example 7

The same procedure as in Example 1 was conducted, except that the concentration of the solution obtained by emulsifying p-hydroxybenzoic acid 2-hexyldecyl ester (EXCEPARL HD-PB manufactured by KAO Corporation) as an impregnation aid was adjusted to a nonvolatile content of 6% by weight to treat the carbon fiber filaments, and resulting in obtaining carbon fiber bundles to be easily impregnated, having a content of the impregnation aid of 3.0% by mass (3.1 parts by mass based on 100 parts by mass of the carbon fibers). The shaped products obtained showed a satisfactory appearance and mechanical properties. The results obtained are shown in Table 1.

Example 8

The same procedure as in Example 1 was conducted, except that the concentration of the solution obtained by emulsifying p-hydroxybenzoic acid 2-hexyldecyl ester (EXCEPARL HD-PB manufactured by KAO Corporation) as an impregnation aid was adjusted to a nonvolatile content of 24% by weight to treat the carbon fiber filaments, and resulting in obtaining carbon fiber bundles to be easily impregnated having a content of the impregnation aid of 12.9% by mass (14.8 parts by mass based on 100 parts by mass of the carbon fibers). The shaped products obtained showed a satisfactory appearance and mechanical properties. The results obtained are shown in Table 1.

Example 9

As an impregnation aid, p-hydroxybenzoic acid 2-hexyldecyl ester (EXCEPARL HD-PB manufactured by KAO Corporation) was used. This impregnation aid was emulsified so as to result in a nonvolatile content of 15% by mass, and the carbon fiber filament was treated therewith to obtain carbon fiber bundles to be easily impregnated, having a content of the impregnation aid of 7.3% by mass (7.9 parts by mass based on 100 parts by mass of the carbon fiber).

Subsequently, the carbon fiber bundles to be easily impregnated obtained above were coated with polyamide 6 (manufactured by Ube Industries, Ltd.: 1015B, melting point: 225° C.) using a crosshead die for electrical-wire coating having an orifice diameter of 3 mm and were then cut into a length of 6 mm, thereby obtaining a material for molding in the form of core-sheath pellets suitable for injection molding, the material for molding having a content ratio of carbon fibers of 18% by mass (the amount of the polyamide 6 was 447.7 parts by mass based on 100 parts by mass of the carbon fibers), a diameter of 3.2 mm, and a length of 6 mm. Using a 110-ton electric injection molding machine (J110AD) manufactured by The Japan Steel Works, Ltd., the material for molding was injection-molded at cylinder temperatures of C1/C2/C3/C4/N=320° C./330° C./330° C./330° C./320° C. (C1 to C4 were cavity and N was nozzle) at a molding cycle time of 35 seconds to obtain a dumbbell for tensile test having a thickness of 4 mm. The shaped products obtained had a satisfactory appearance in which neither any fibrous lump due to dispersion failure nor a bubble was observed. The results obtained are shown in Table 1.

Example 10

As an impregnation aid, p-hydroxybenzoic acid 2-hexyldecyl ester (EXCEPARL HD-PB manufactured by KAO Corporation) was used. This impregnation aid was emulsified so as to result in a nonvolatile content of 12% by mass, and the carbon fiber filament was treated therewith to obtain carbon fiber bundles to be easily impregnated, having a content of the impregnation aid of 6.1% by mass (6.5 parts by mass based on 100 parts by mass of the carbon fiber).

Subsequently, the carbon fiber bundles to be easily impregnated obtained above were coated with polyamide 9T (manufactured by Kuraray Co., Ltd.: Genestar N1000A, melting point: 300° C.) using a crosshead die for electrical-wire coating having an orifice diameter of 3 mm and were then cut into a length of 6 mm, thereby obtaining a material for molding in the form of core-sheath pellets suitable for injection molding, the material for molding having a content ratio of carbon fibers of 20% by mass (the amount of the polyamide 9T was 393.5 parts by mass based on 100 parts by mass of the carbon fibers), a diameter of 3.2 mm, and a length of 6 mm. Using a 110-ton electric injection molding machine (J110AD) manufactured by The Japan Steel Works, Ltd., the material for molding was injection-molded at cylinder temperatures of C1/C2/C3/C4/N=320° C./330° C./330° C./330° C./320° C. (C1 to C4 were cavity and N was nozzle) at a molding cycle time of 35 seconds to obtain a dumbbell for tensile test having a thickness of 4 mm. The shaped products obtained had a satisfactory appearance in which neither any fibrous lump due to dispersion failure nor a bubble was observed. The results obtained are shown in Table 1.

Comparative Example 1

The same procedure as in Example 1 was conducted, except for using p-hydroxybenzoic acid 2-ethylhexyl ester, as an impregnation aid, in place of p-hydroxybenzoic acid 2-hexyldecyl ester, emulsifying this impregnation aid so as to result in a nonvolatile content of 8% by mass, and treating the carbon fiber filament with the emulsified impregnation aid to obtain carbon fiber bundles to be easily impregnated having a content of the impregnation aid of 7.0% by mass (7.5 parts by mass based on 100 parts by mass of the carbon fiber). Owing to generation of a large amount of gas at the time of molding, silvery-white streaks so called silver streaks were present in a flow direction on the surface of the resulting shaped product. The results obtained are shown in Table 1.

Comparative Example 2

Carbon fiber bundles to be easily impregnated were not prepared using an impregnation aid, but PAN-based carbon fiber filaments (STS40-F13, manufactured by Toho Tenax Co., Ltd.; fiber diameter, 7.0 μm; number of filaments, 24,000) in which a urethane-epoxy-based sizing agent has been impregnated in an amount of 1.2% by mass were coated with UBE Nylon 66 (UBE Nylon 66 manufactured by Ube Industries, Ltd.). Then, the same procedures as in Example 1 were conducted. Lumps of the fiber bundle owing to poor dispersion were present on the surface of the resulting shaped product and tensile strength thereof was also found to be a low value. The results obtained are shown in Table 1.

Comparative Example 3

A carbon fiber-reinforced polyamide 66 obtained by melt-kneading 100 parts by mass of carbon fibers and 233.3 part by mass of polyamide 66 in a twin-screw extrusion molding machine to form a pellet having a content ratio of carbon fiber of 30% by mass was subjected to injection molding under the same conditions as in Example 1. The resulting shaped product showed a good dispersion state of the carbon fibers, but the average fiber length of the carbon fibers in the shaped product was 0.20 mm, which was short, and the tensile strength was 185 MPa, which was not a satisfactory value.

Comparative Example 4

Carbon fiber bundles to be easily impregnated were not prepared using an impregnation aid, but PAN-based carbon fiber filaments (STS40-F13, manufactured by Toho Tenax Co., Ltd.; fiber diameter, 7.0 μm; number of filaments, 24,000) in which a urethane-epoxy-based sizing agent has been impregnated in an amount of 1.2% by mass were coated with polyamide 66 (UBE Nylon 66 manufactured by Ube Industries, Ltd.; melting point, 265° C.) using a crosshead die for electrical-wire coating having an orifice diameter of 3 mm, and the obtained carbon fiber bundles were then cut into a length of 6 mm, thereby obtaining pellets having a content ratio of carbon fibers of 20% by mass (the amount of the polyamide 66 was 393.6 parts by mass based on 100 parts by mass of the carbon fibers), a diameter of 3.2 mm, and a length of 6 mm. To the pellets, 6.4 mass of p-hydroxybenzoic acid 2-hexyldecyl ester was added (post-addition) based on 100 parts by mass of the carbon fibers to obtain a material for molding suitable for injection molding. The material for molding was subjected to injection molding under the same conditions as in Example 1 to obtain a dumbbell for tensile test having a thickness of 4 mm. The resulting shaped product had low tensile strength and the appearance was also poor. The results obtained are shown in Table 1.

Comparative Example 5

The same procedure as in Example 1 was conducted, except that the concentration of the solution obtained by emulsifying p-hydroxybenzoic acid 2-hexyldecyl ester as an impregnation aid was adjusted to a nonvolatile content of 4% by weight to treat the carbon fiber filaments, and resulting in obtaining carbon fiber bundles to be easily impregnated, having a content of the impregnation aid, which is p-hydroxybenzoic acid 2-hexyldecyl ester, of 2.0% by mass (2.0 parts by mass based on 100 parts by mass of the carbon fibers). The resulting shaped product had low tensile strength and the appearance was also poor. The results obtained are shown in Table 1.

Comparative Example 6

The same procedure as in Example 1 was conducted, except that the concentration of the solution obtained by emulsifying p-hydroxybenzoic acid 2-hexyldecyl ester as an impregnation aid was adjusted to a nonvolatile content of 37.5% by weight to treat the carbon fiber filaments, and resulting in obtaining carbon fiber bundles to be easily impregnated, having a content of the impregnation aid, which is p-hydroxybenzoic acid 2-hexyldecyl ester, of 16.6% by mass (20.0 parts by mass based on 100 parts by mass of the carbon fibers). The shaped products obtained had a satisfactory appearance, but tensile strength was low and heat resistance was inferior. The results obtained are shown in Table 1.

Comparative Example 7

The same procedure as in Example 9 was conducted, except that, as an impregnation aid, a terpene phenol resin (manufactured by Yasuhara Chemical Co., Ltd.: YS Polystar G150) was used in place of p-hydroxybenzoic acid 2-hexyldecyl ester, and the solution obtained by emulsifying this impregnation aid was adjusted to a nonvolatile content of 18% by weight to treat the carbon fiber filaments, and resulting in obtaining carbon fiber bundles to be easily impregnated, having a content of the impregnation aid of 8.9% by mass (9.8 parts by mass based on 100 parts by mass of the carbon fibers). The resulting shaped product had low tensile strength and appearance thereof was also poor. The results obtained are shown in Table 1.

In the above Examples 1 to 10, since the carbon fibers were well dispersed and shaped products having excellent mechanical properties were obtained, it is apparent that the carbon fiber bundles to be easily impregnated was smoothly impregnated with the thermoplastic polyamide at the time of molding when using the material for molding of the present invention. However, the present inventors more directly attempted to confirm the degree of easy impregnation property of the carbon fiber bundles to be easily impregnated. However, in the injection molding, an operation of collecting, by quickly stopping a molding machine, a specimen at a stage that the material for molding was plasticized and the carbon fiber bundles to be easily impregnated began to be impregnated with the thermoplastic polyamide has a problem in safety and is a possibility of damaging the molding machine, so that the operation was difficult to conduct.

Therefore, the present inventors prepared a specimen by: using carbon fiber bundles to be easily impregnated, carbon fiber filaments, and the like same as in each of the above Examples or Comparative Examples; prepared a material for molding by placing a sheet-like thermoplastic polyamide thereon; and heating the material for molding on a metal plate during a short time to obtain a specimen. The present inventors then determined impregnation ratio of the thermoplastic polyamide that is a matrix resin (hereinafter referred to as "matrix resin impregnation ratio" including the case where a thermoplastic resin other than the thermoplastic polyamide is used) for a specimen obtained to evaluate easy impregnation property of the specimen. Hereinafter, the obtained results of the evaluation in the easy impregnation property for the carbon fiber bundles to be easily impregnated or the like of Examples 1 to 10 and Comparative Examples 1 to 7 are shown as Reference Examples A to H and Comparative Reference Examples A to E, respectively.

Reference Example A

A sheet-like polyamide 66 (UBE Nylon 66 manufactured by Ube Industries, Ltd.) having a thickness of 300 μm, a width of 10 mm, and a length of 20 mm was placed on the upper surface of carbon fiber bundles to be easily impregnated (width: 10 mm, length: 20 mm) having a content of p-hydroxybenzoic acid 2-hexyldecyl ester of 6% by mass (6.4 parts by mass based on 100 parts by mass of the carbon fibers) obtained by the same operations as in Example 1, and the carbon fiber bundles in this state were put on a hot plate heated at 280° C., thereby heating the carbon fiber bundles to be easily impregnated and the sheet-like polyamide 66 for 2 minutes. A part where the carbon fiber bundles to be easily impregnated were impregnated with the polyamide 66 melted by heating became a wet state and carbon single fibers were fixed with polyamide 66. On the other hand, in a part where no impregnation with polyamide 66 occurred in the carbon fiber bundles, no fixation of the carbon single fibers with polyamide 66 was observed in a dry state and the carbon single fibers are prone to be separated. Therefore, carbon single fibers were separated in the part of the specimen after heating where no impregnation with polyamide 66 occurred, and the mass of the carbon single fibers was measured. According to the following calculation formula (D), the matrix resin impregnation ratio into the carbon fiber bundles to be easily impregnated in the case where the matrix resin was polyamide 66 was calculated.

Matrix resin impregnation ratio (% by mass)=100−
(Mass of unimpregnated carbon single fibers as
matrix resin/Mass of carbon fiber bundles)×100    (D)

The matrix resin impregnation ratio was 97% by mass, which was extremely high, and it was confirm that the carbon fiber bundles to be easily impregnated, used in Example 1, were extremely easily impregnated with polyamide 66.

Reference Example B

The same procedure as in Reference Example A was conducted, except for using carbon fiber bundles to be easily impregnated (width: 10 mm, length: 20 mm) having a content of p-hydroxybenzoic acid 2-hexyldecyl ester of 11% by mass (12.3 parts by mass based on 100 parts by mass of the carbon fibers) obtained by the same operations as in Examples 2 and 3. The matrix resin impregnation ratio was 100% by mass, which was extremely high, and it was confirm that the carbon fiber bundles to be easily impregnated, used in Examples 2 and 3, were extremely easily impregnated with polyamide 66.

Reference Example C

The same procedure as in Reference Example A was conducted, except for: using carbon fiber bundles to be easily impregnated (width: 10 mm, length: 20 mm) having a content of p-hydroxybenzoic acid 2-hexyldecyl ester as an impregnation aid of 10.5% by mass (11.7 parts by mass based on 100 parts by mass of the carbon fibers) obtained by the same operations as in Examples 4 and 5; and using a sheet-like polyamide 10T (manufactured by Daicel-Evonik, Ltd.) in place of the sheet-like polyamide 66. The matrix resin impregnation ratio was 98% by mass, which was extremely high, and it was confirm that the carbon fiber bundles to be easily impregnated, used in Example 4, were extremely easily impregnated with polyamide 10T.

Reference Example D

The same procedure as in Reference Example A was conducted, except for using carbon fiber bundles to be easily impregnated (width: 10 mm, length: 20 mm) having a content ratio of p-hydroxybenzoic acid 2-hexyldecyl ester of 6% by mass (6.4 parts by mass based on 100 parts by mass of the carbon fibers) obtained by the same operations as in Example 6. The matrix resin impregnation ratio was 100% by mass, which was extremely high, and it was confirm that the carbon fiber bundles to be easily impregnated, used in Example 6, were extremely easily impregnated with polyamide 66.

Reference Example E

The same procedure as in Reference Example A was conducted, except for using carbon fiber bundles to be easily impregnated (width: 10 mm, length: 20 mm) having a content ratio of p-hydroxybenzoic acid 2-hexyldecyl ester of 3% by mass (3.1 parts by mass based on 100 parts by mass of the carbon fibers) obtained by the same operations as in Example 7. The matrix resin impregnation ratio was 95% by mass, which was extremely high, and it was confirm that the carbon fiber bundles to be easily impregnated, used in Example 7, were extremely easily impregnated with polyamide 66.

Reference Example F

The same procedure as in Reference Example A was conducted, except for using carbon fiber bundles to be easily impregnated (width: 10 mm, length: 20 mm) having a content ratio of p-hydroxybenzoic acid 2-hexyldecyl ester of 12.9% by mass (14.8 parts by mass based on 100 parts by mass of the carbon fibers) obtained by the same operations as in Example 8. The matrix resin impregnation ratio was 100% by mass, which was extremely high, and it was confirm that the carbon fiber bundles to be easily impregnated, used in Example 8, were extremely easily impregnated with polyamide 66.

Reference Example G

The same procedure as in Reference Example A was conducted, except for: using carbon fiber bundles to be easily impregnated (width: 10 mm, length: 20 mm) having a content ratio of p-hydroxybenzoic acid 2-hexyldecyl ester of 7.3% by mass (7.9 parts by mass based on 100 parts by mass of the carbon fibers) obtained by the same operations as in Example 9; and using a sheet-like polyamide 6 in place of the sheet-like polyamide 66. The matrix resin impregnation ratio was 100% by mass, which was extremely high, and it was confirm that the carbon fiber bundles to be easily impregnated, used in Example 9, were extremely easily impregnated with polyamide 6.

Reference Example H

The same procedure as in Reference Example A was conducted, except for: using carbon fiber bundles to be easily impregnated (width: 10 mm, length: 20 mm) having a content ratio of p-hydroxybenzoic acid 2-hexyldecyl ester of 6.1% by mass (6.5 parts by mass based on 100 parts by mass of the carbon fibers) obtained by the same operations as in Example 10; and using a sheet-like polyamide 9T in place of the sheet-like polyamide 66. The matrix resin impregnation ratio was 100% by mass, which was extremely high, and it was confirm that the carbon fiber bundles to be easily impregnated, used in Example 10, were extremely easily impregnated with polyamide 9T.

Comparative Reference Example A

The same procedure as in Reference Example A was conducted, except for using carbon fiber bundles to be easily impregnated (width: 10 mm, length: 20 mm) having a content of p-hydroxybenzoic acid 2-hexyldecyl ester as an impregnation aid of 7% by mass (7.5 parts by mass based on 100 parts by mass of the carbon fibers) obtained by the same operations as in Comparative Example 1. The matrix resin impregnation ratio was 99% by mass, which was extremely high, and it was confirm that the carbon fiber bundles to be easily impregnated, having a content of the impregnation aid of 7% by mass and used in Comparative Example 1, were extremely easily impregnated with polyamide 66. However, a large amount of gas was generation by decomposition during heating.

Comparative Reference Example B

The same procedure as in Reference Example A was conducted, except for using, in place of the carbon fiber bundles to be easily impregnated, the carbon fiber filaments (STS40-F13, manufactured by Toho Tenax Co., Ltd.; fiber diameter, 7 μm; number of filaments, 24,000) in which a urethane-epoxybased sizing agent has been impregnated in an amount of 1.2% by mass, which were used in Comparative Example 2. The matrix resin impregnation ratio was 10% by mass, which was extremely low, and it was confirm that the carbon fiber filaments used in Comparative Example 2, were extremely difficult to be impregnated with polyamide 66.

Comparative Reference Example C

The same procedure as in Reference Example A was conducted, except for: using, in place of the carbon fiber bundles to be easily impregnated, the carbon fiber bundles used in Comparative Example 4, the carbon fiber bundles having a urethane-epoxy-based sizing agent in a content ratio of 1.2% by mass; and a sheet-like polyamide 66 (UBE Nylon 66 manufactured by Ube Industries, Ltd.) having a thickness of 300 μm, a width of 10 mm, and a length of 20 mm, which was obtained by adding an impregnation aid. The matrix resin impregnation ratio was 2% by mass, which was extremely low, and it was confirm that the carbon fiber filaments used in Comparative Example 4, were extremely difficult to be impregnated with polyamide 66.

Comparative Reference Example D

The same procedure as in Reference Example A was conducted, except for using, in place of the carbon fiber bundles to be easily impregnated, carbon fiber filaments in which p-hydroxybenzoic acid 2-ethylhexyl ester as an impregnation aid were impregnated in a content of 2.0% by mass (STS40-F13, manufactured by Toho Tenax Co., Ltd.; average diameter, 7.0 μm; number of filaments, 24,000), which was the same ones as in Comparative Example 5. The matrix resin impregnation ratio was 90% by mass, and the carbon fiber filaments used in Comparative Example 5, were easily impregnated with polyamide 66.

Comparative Reference Example E

The same procedure as in Reference Example A was conducted, except for using, in place of the carbon fiber bundles to be easily impregnated, carbon fiber filaments in which p-hydroxybenzoic acid 2-ethylhexyl ester as an impregnation aid were impregnated in a content of 20.0% by mass (STS40-F13, manufactured by Toho Tenax Co., Ltd.; average diameter, 7.0 μm; number of filaments, 24,000), which were the same ones as in Comparative Example 6. The matrix resin impregnation ratio was 100% by mass, which was extremely high, and the carbon fiber filaments used in Comparative Example 6, were extremely easily impregnated with polyamide 66.

TABLE 1

|  | Example 1 | Example 2 | Example 3 | Example 4 | Example 5 |
|---|---|---|---|---|---|
| *Amount of matrix resin (parts by mass based on 100 parts by mass of carbon fiber)* | | | | | |
| Polyamide 66 | 393.6 | 387.7 | 221 | — | — |
| Polyamide 10T | — | — | — | 388.3 | — |
| Polyamide 9T | — | — | — | — | — |
| Polyamide 6 | — | — | — | — | — |
| *Content of surface treatment agent (parts by mass based on 100 parts by mass of carbon fiber)* | | | | | |
| [Impregnation aid] | | | | | |
| p-Hydroxybenzoic acid 2-hexyldecyl ester | 6.4 | 12.3 | 12.3 | 11.7 | 11.7 |
| p-Hydroxybenzoic acid 2-ethylhexyl ester | — | — | — | — | — |
| [Other treatment agent] | | | | | |
| Urethane-epoxy-based sizing agent | — | — | — | — | — |
| [Comparative impregnation aid] | | | | | |
| Terpene phenol resin G150 | — | — | — | — | — |
| Addition method of surface treatment agent | emulsion | emulsion | emulsion | emulsion | emulsion |
| Content ratio of surface treatment agent in carbon fiber bundles | 6.0% | 11.0% | 11.0% | 10.5% | 10.5% |
| [Shaped product] | | | | | |
| Content ratio of carbon fibers | 20% | 20% | 30% | 20% | 30% |
| Average fiber length [mm] | 1.2 | 1.5 | 1 | 1.1 | 0.9 |
| Tensile strength [MPa] | 252 | 253 | 275 | 281 | 295 |
| Appearance of shaped product | ○ | ○ | ○ | ○ | ○ |
| [Evaluation of easy impregnation property of carbon fiber bundle] | | | | | |
| Corresponding Reference Example | Reference Example A | Reference Example B | Reference Example B | Reference Example C | Reference Example C |
| Matrix resin impregnation ratio | 97% | 100% | 100% | 98% | 98% |

|  | Example 6 | Example 7 | Example 8 | Example 9 | Example 10 |
|---|---|---|---|---|---|
| *Amount of matrix resin (parts by mass based on 100 parts by mass of carbon fiber)* | | | | | |
| Polyamide 66 | 394.7 | 396.9 | 385.2 | — | — |
| Polyamide 10T | — | — | — | — | — |
| Polyamide 9T | — | — | — | — | 393.5 |
| Polyamide 6 | — | — | — | 447.1 | — |

TABLE 1-continued

| Content of surface treatment agent (parts by mass based on 100 parts by mass of carbon fiber) | | | | | |
|---|---|---|---|---|---|
| [Impregnation aid] | | | | | |
| p-Hydroxybenzoic acid 2-hexyldecyl ester | 6.4 | 3.1 | 14.8 | 7.9 | 6.5 |
| p-Hydroxybenzoic acid 2-ethylhexyl ester | — | — | — | — | — |
| [Other treatment agent] | | | | | |
| Urethane-epoxy-based sizing agent | — | — | — | — | — |
| [Comparative impregnation aid] | | | | | |
| Terpene phenol resin G150 | — | — | — | — | — |
| Addition method of surface treatment agent | (*2) | emulsion | emulsion | emulsion | emulsion |
| Content ratio of surface treatment agent in carbon fiber bundles | 6% | 3.0% | 12.9% | 7.3% | 6.1% |
| [Shaped product] | | | | | |
| Content ratio of carbon fibers | 20% | 20% | 20% | 18% | 20% |
| Average fiber length [mm] | 1.2 | 1.6 | 1.4 | 0.7 | 1.1 |
| Tensile strength [MPa] | 248 | 249 | 255 | 220 | 252 |
| Appearance of shaped product | ○ | ○ | ○ | ○ | ○ |
| [Evaluation of easy impregnation property of carbon fiber bundle] | | | | | |
| Corresponding Reference Example | Reference Example D | Reference Example E | Reference Example F | Reference Example G | Reference Example H |
| Matrix resin impregnation ratio | 100% | 95% | 100% | 100% | 100% |

| | Comparative Example 1 | Comparative Example 2 | Comparative Example 3 | Comparative Example 4 | Comparative Example 5 | Comparative Example 6 | Comparative Example 7 |
|---|---|---|---|---|---|---|---|
| Amount of matrix resin (parts by mass based 100 parts by mass of carbon fiber) | | | | | | | |
| Polyamide 66 | 392.5 | 398.8 | 233.3 | 393.6 | 398 | 380 | — |
| Polyamide 10T | — | — | — | — | — | — | — |
| Polyamide 9T | — | — | — | — | — | — | — |
| Polyamide 6 | — | — | — | — | — | — | 390.2 |
| Content of surface treatment agent (parts by mass based on 100 parts by mass of carbon fiber) | | | | | | | |
| [Impregnation aid] | | | | | | | |
| p-Hydroxybenzoic acid 2-hexyldecyl ester | — | — | — | (6.4) | 2.0 | 20.0 | — |
| p-Hydroxybenzoic acid 2-ethylhexyl ester | 7.5 | — | — | — | — | — | — |
| [Other treatment agent] | | | | | | | |
| Urethane-epoxy-based sizing agent | — | 1.2 | — | 1.2 | — | — | — |
| [Comparative impregnation aid] | | | | | | | |
| Terpene phenol resin G150 | — | — | — | — | — | — | 9.8 |
| Addition method of surface treatment agent | emulsion | — | — | post-addition of impregnation aid | emulsion | emulsion | emulsion |
| Content ratio of surface treatment agent in carbon fiber bundles | 7.0% | 1.2% | — | 1.2% | 2.0% | 16.6% | 8.9% |
| [Shaped product] | | | | | | | |
| Content ratio of carbon fibers | 20% | 20% | 30% | 20% | 20% | 20% | 20% |
| Average fiber length [mm] | 1.1 | 2.0 | 0.2 | 2.2 | 1.8 | 0.4 | 1 |
| Tensile strength [MPa] | 249 | 180 | 185 | 184 | 191 | 210 | 164 |
| Appearance of shaped product | Δ | X | ○ | X | X | ○ | X |
| [Evaluation of easy impregnation property of carbon fiber bundle] | | | | | | | |
| Corresponding Reference Example | Comparative Reference Example A | Comparative Reference Example B | — | Comparative Reference Example C | Comparative Reference Example D | Comparative Reference Example E | — |
| Matrix resin impregnation ratio | 99% | 10% | — | 2% | 90% | 100% | — |

*1) % means % by mass unless particularly noted.
(*2) p-Hydroxybenzoic acid 2-ethylhexyl ester heated to 120° C. and melted to be liquid was added dropwise onto the surface of the carbon fiber bundles and the whole was passed through a hot bar heated at 120° C. to impregnate the carbon bundles with the molten p-hydroxybenzoic acid 2-ethylhexyl ester.

INDUSTRIAL APPLICABILITY

The material for molding of the invention makes it possible to produce shaped products having excellent mechanical strength by a simple method. This material for molding is extremely useful in various industrial fields including interior and exterior materials and components for transportation means, such as motor vehicles, ships, and aircraft, and for electrical/electronic appliances, business appliances, or the like.

While the invention has been described in detail and with reference to specific embodiments thereof, it will be apparent to one skilled in the art that various changes and modifications can be made therein without departing from the spirit and scope thereof.

This application is based on a Japanese patent application filed on Jul. 5, 2012 (Application No. 2012-151469), the contents thereof being incorporated herein by reference.

The invention claimed is:

1. A material for molding comprising:
carbon fiber bundles including carbon fibers and at least one impregnation aid in an amount of 3 to 15 parts by mass based on 100 parts by mass of the carbon fibers, wherein the at least one impregnation aid is a p-hydroxybenzoic acid alkyl ester in which an alkyl group thereof has 14 or more carbon atoms, the at least one impregnation aid satisfying the following requirements 1 to 3; and
a thermoplastic polyamide in an amount of 50 to 2000 parts by mass based on 100 parts by mass of the carbon fibers, the thermoplastic polyamide adhered to the carbon fiber bundles:
Requirement 1: liquid at 280° C. has a viscosity of 10 Pa·s or less;
Requirement 2: a reduction ratio in a glass transition temperature ($\Delta Tg$) of larger than 0.2 (° C./%), the reduction ratio in glass transition temperature ($\Delta Tg$) being defined by the following expression (A) including a glass transition temperature $Tg_1$ (° C.) of a resin composition obtained by incorporating the impregnation aid in an amount of 1 part by mass to 100 parts by mass based on 100 parts by mass of the thermoplastic polyamide, the glass transition temperature $Tg_0$ (° C.) of the thermoplastic polyamide, and a content (%) of the impregnation aid:

Reduction ratio in glass transition temperature ($\Delta Tg$) (° C./%)=(($Tg_0$ (° C.))−($Tg_1$ (° C.))/(content of impregnation aid (%)))  (A)

wherein the content of impregnation aid (%) is defined by the following expression (B):

Content of impregnation aid (%)=100×(amount of impregnation aid (parts by mass))/(amount of the thermoplastic polyamide (parts by mass))  (B); and Requirement 3: a boiling point under normal pressure is 340° C. or more and a heating loss at 300° C. under a nitrogen atmosphere is 2%/minute or less.

2. The material for molding according to claim 1, wherein the p-hydroxybenzoic acid alkyl ester is represented by formula (1):

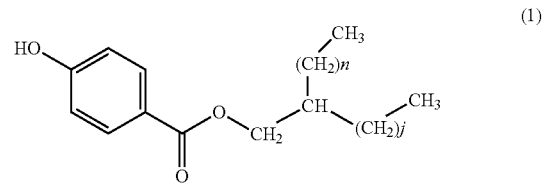

wherein n is an integer of 4 to 7, and j is an integer of 6 to 9.

3. The material for molding according to claim 1, wherein the thermoplastic polyamide has a melting point of 250 to 300° C.

4. The material for molding according to claim 1, wherein the material for molding has a core-sheath structure in which the carbon fiber bundles is a core component and the thermoplastic polyamide is a sheath component.

5. The material for molding according to claim 1, wherein a form of the material for molding is a pellet.

6. The material for molding according to claim 5, wherein a length of the pellet in a longitudinal direction is from 3 to 10 mm.

7. A shaped product obtained from the material for molding according to claim 1.

8. The shaped product according to claim 7, wherein carbon fibers derived from the carbon fiber bundles are dispersed in a state of having an average fiber length of 0.3 mm or more.

9. The shaped product according to claim 7, wherein a content ratio of carbon fibers (% by mass) and a tensile strength of the material for molding determined by examination of a 4 mm dumbbell according to ISO 527 standard have a relationship satisfying the following expression (C):

Content ratio of carbon fibers (% by mass)×4+100<Tensile strength (MPa).  (C)

10. A method for manufacturing the shaped product according to claim 7, the method comprising:
placing the material for molding in a mold under a condition of a plasticizing temperature or more of the thermoplastic polyamide to impregnate the thermoplastic polyamide into the carbon fiber bundles in the material for molding;
molding the material for molding while separating and dispersing the carbon fiber bundles in the carbon fiber bundles; and then
cooling a molded material.

* * * * *